United States Patent [19]

Morton

[11] 4,380,419
[45] Apr. 19, 1983

[54] ENERGY COLLECTION AND STORAGE SYSTEM

[76] Inventor: Paul H. Morton, 180 Berkeley St., Satellite Beach, Fla. 32937

[21] Appl. No.: 254,503

[22] Filed: Apr. 15, 1981

[51] Int. Cl.³ ............................................. F04B 35/00
[52] U.S. Cl. ..................................... 417/334; 60/398; 417/54; 417/121
[58] Field of Search ............... 417/334, 335, 336, 121, 417/119; 60/398, 413, 417, 405, 416

[56] References Cited

U.S. PATENT DOCUMENTS

| | | | |
|---|---|---|---|
| 903,372 | 11/1908 | Gardner | 417/336 |
| 1,091,313 | 3/1914 | Erickson | 417/101 |
| 2,433,896 | 1/1948 | Gay | |
| 2,454,058 | 11/1948 | Hays | 60/398 |
| 2,626,740 | 1/1953 | Levy | 417/101 |
| 3,939,356 | 2/1976 | Loane | 60/398 |
| 4,305,700 | 12/1981 | Beard | 417/121 |

Primary Examiner—Carlton R. Croyle
Assistant Examiner—T. S. Thorpe
Attorney, Agent, or Firm—Harold Gell

[57] ABSTRACT

A system for the collection and storage of energy, wherein compressed air from any source is utilized to make a fully automatic, sequential series of chamber-to-chamber blow-type vertical water lifts to an elevated water storage reservoir. Potential energy stored in the reservoir is extracted by means of an hydraulic air compressor located below the reservoir and functioning by virtue of the resultant pressure head.

10 Claims, 3 Drawing Figures

ENERGY COLLECTION AND STORAGE SYSTEM

THE INVENTION

This invention relates to a means to extract and store energy freely existing in the environment by using it to compress air which is then used to elevate water to a storage reservoir so as to develop a source for an hydraulic pressure head capable of delivering the thus stored energy on demand.

BACKGROUND OF THE INVENTION

The effective utilization of energies derived from nature's intermittent but inexhaustible sources, such as those inherent in the wind, the tides and waves, has brought forth a tremendous outpouring of man's creative talent. The limited supply of easily accessible fossil fuel available to contemporary civilization has fostered a research and development program involving tremendous amounts of money to speed and encourage this creative effort. The inventor fully endorses this program of large-scale energy systems' development and realizes that contemporary civilization will not be able to progress without these systems coming on-line in the not too distant furture. The inventor also realizes that when these systems do come on-line, there will be vast geographical areas of the world where power from these systems will not be available because of economic or other factors. Inexpensive small-scale energy collection and storage systems can be utilized to fill some of the energy gap that will exist in these areas, and the system herein described was designed with this gap in mind.

The varying intensities and intermittent nature of winds create a collection and storage problem. Vast amounts of creative energy have been expended in finding solutions to these problems. The system herein described offers nothing new in this area, other than a novel approach to energy collection, storage, and utilization. The novelty factor involved consists in the utilization of compressed air to lift water in steps to an elevated reservoir, and the extraction of energy from the reservoir, in just one step, by means of an hydraulic air compressor. No mechanical energy-transfer devices are utilized in the energy storage or extraction process. This eliminates the need for piston or turbine type mechanical pumps. In this particular installation herein outlined, the initial air supply to the system is provided by a wind turbine driving a conventional piston-type air compressor. As will be explained in the text, a remotely-located hydraulic air compressor could also be utilized to obtain the initial compressed air supply, which would free the system from a dependence on any mechanical type of pumping device.

OBJECTIVES OF THE INVENTION

It is a primary objective of the present invention to provide a small, energy collection and storage system that can be utilized in rural areas having average winds of intensities great enough to drive a small wind turbine.

A further objective of the present invention is to provide an energy collection and storage system capable of pumping water from a number of wells with one wind turbine, the distances from the wind turbine to the well locations in some installation being in excess of 3,000 feet.

Another objective of the present invention is to provide an energy collection and storage system wherein a sufficient supply of energy can be stored to insure an adequate supply of safe, clean drinking water for household and livestock use on a small ranch, regardless of wind conditions.

A still further objective of the present invention is to provide an energy collection and storage system that utilizes existing wells having diameters within the range of 4 to 6 inches.

Another objective of the present invention is to provide an energy collection and storage system capable of functioning with wells having diameters as small as two inches.

Another objective of the present invention is to provide an energy collection and storage system which will utilize off-the-shelf items for fabrication purposes when possible.

A still further objective of the present invention is to provide an energy collection and storage system utilizing PVC pipe and plastic tubing to minimize capital outlay and maintenance requirements.

Another objective of the present invention is to provide an energy collection and storage system capable of operating automatically from any adequate source of compressed air.

A further objective of the present invention is to provide an energy collection and storage system that can be utilized in very small or very large installations without a change in the basic system design.

The foregoing and other objectives of the invention will become apparent in light of the drawings, specification and claims contained herein.

SUMMARY OF THE INVENTION

The system disclosed herein is powered by compressed air from any suitable source such as a wind, tide or wave air compressor and utilizes the thus extracted energy to make a series of chamber-to-chamber blow-type vertical water lifts to elevate water to a storage reservoir. The potential energy represented by an hydraulic head created by the water in the storage reservoir is extracted by means of a hydraulic air compressor which creates a reversal of the physical process involved in the chamber-to-chamber blow-type vertical water lifts. A reciprocating water piston within the compressor is supplied with water from the elevated storage reservoir and makes a one-step energy extraction from the reservoir that is capable of delivering, on a short-term basis, compressed air with pressures and volumes much higher than that initiallly supplied to the system.

DESCRIPTION OF THE INVENTION

Figure 1:
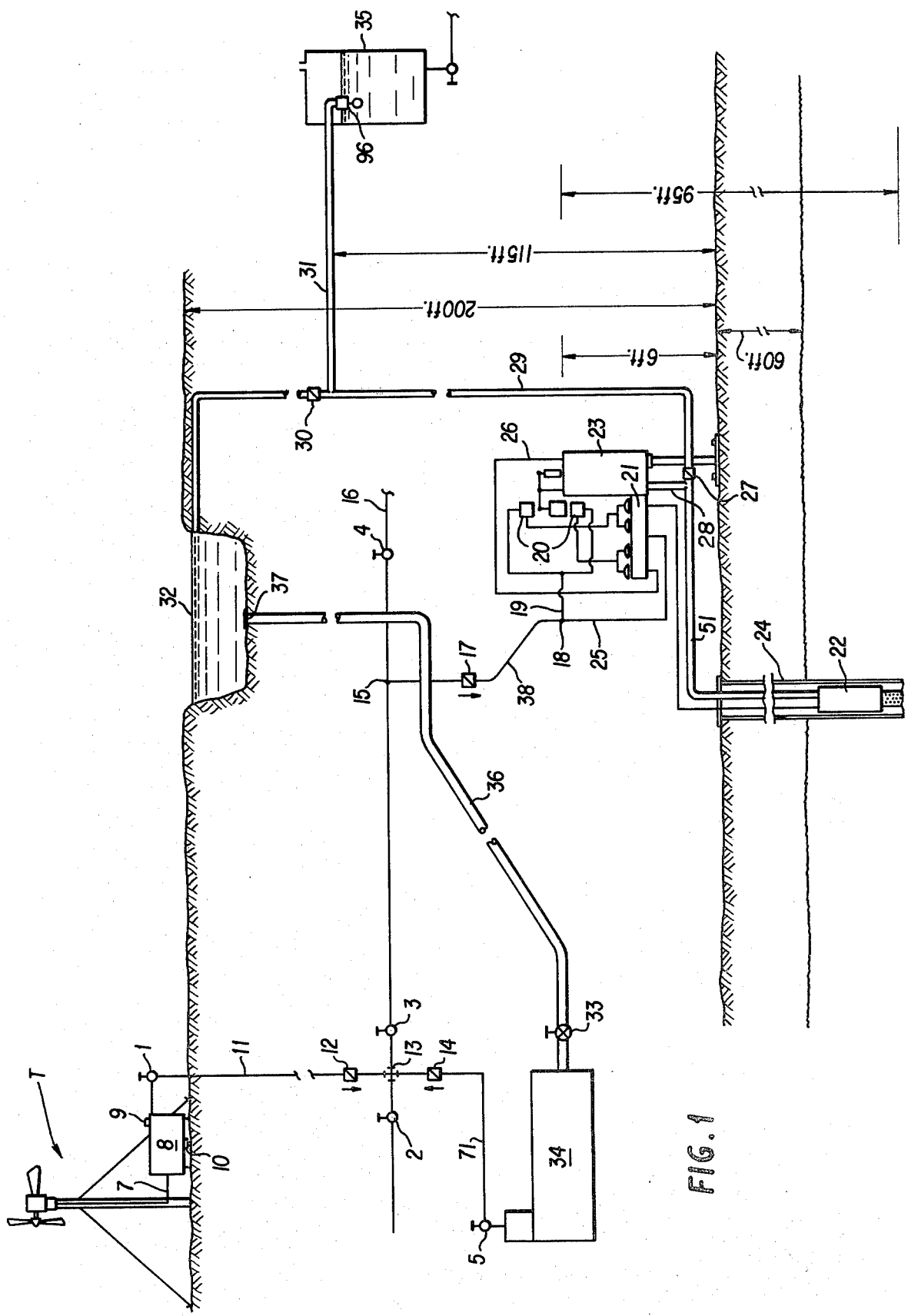
FIG. 1 is a stylized, schematic representation of an exemplary adaptation of the energy collection and storage system of the present invention.

To illustrate the practical aspects of the invention, and to facilitate an explanation of the physical processes involved in the energy transfers, a hypothetical system is presented in FIG. 1. The hypothetical system is designed for installation on a small cattle ranch, located in a remote area, with no access to electricity. The object of the installation is to provide a clean, uninterrupted supply of domestic water from a well located at the homesite, and from two other wells located in grazing areas approximately one-half mile from the homesite. The grazing areas cannot be provided with water from the domestic water storage tank, even though they are a lower elevation, because of intervening ridges that prevent gravity flow. A second object of the installation is to provide the rancher with a compressed air supply, so that occasional short-durtion work can be done with conventional pneumatic power tools. A large air storage tank is located in the ranch workshop to absorb these occasional high-energy demands on the system with a minimum drop in the connecting air line pressure.

Figure 2:
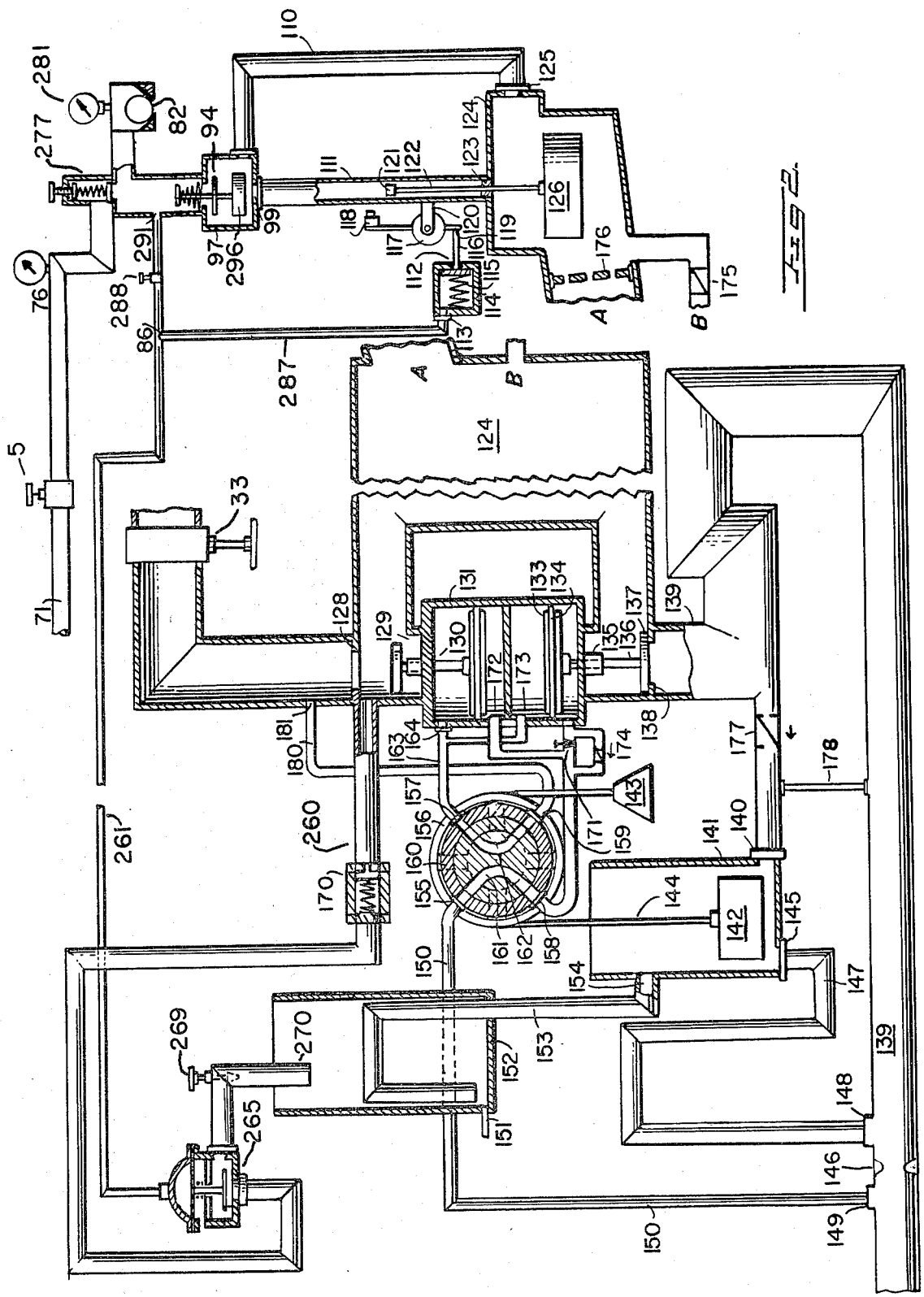
FIG. 2 is a stylized schematic of the hydraulic air compressor.

Illustrated in FIG. 1 is a wind turbine T, driving a conventional piston-type air compressor. An off-the-shelf wind turbine driving a two-cylinder compressor was selected for this installation. The turbine, compressor and necessary installation hardware are all currently available from Bowjon of Burbank, Calif. The turbine is approximately 8 ft. in diameter, and the two-cylinder compressor it drives will provide compressed air at 100 psi at a rate in excess of 2 cu.ft. per minute in 20 mph winds. The hydraulic air compressor 34 of FIG. 2 is fully explained in a previous U.S. Pat. No. 4,265,599 granted May 5, 1981 granted to the inventor, but will be reviewed in this presentation. The compressor automatically controls alternate flood and drain valves and vents a closed container to create a reciprocating water piston effect, utilizing an elevated water head as an energy source. In this installation, atmospheric air is brought into the chamber during the drain cycle, compressed, and expelled from the container on the filling, or flood, cycle.

Figure 3:
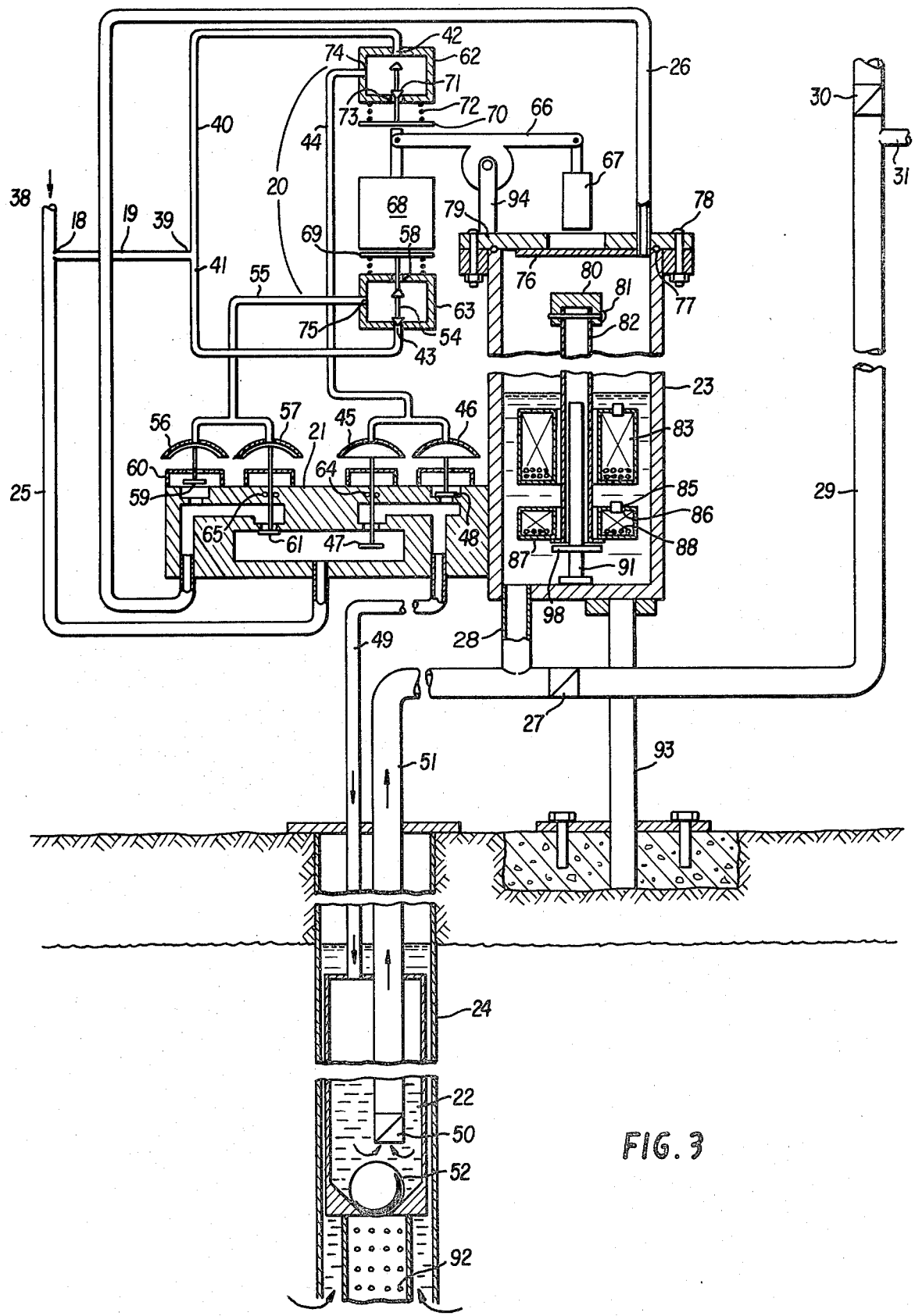
FIG. 3 is a stylized schematic of the second stage blow chamber, master control valve assembly, and first stage blow chamber.

The energy storage reservoir 32 of FIG. 1 consists of an excavated pond. The bottom and sides of the pond are covered with plastic sheeting after excavation to prevent seepage loss. Below the pond is the second stage blow chamber 23. On the top left of this vertical cylinder is the master control valve assembly 20. On the bottom left of the cylinder is the blow and vent manifold assembly 21. FIG. 3 shows these assemblies in detail. A standard well casing is illustrated below the second stage blow chamber. Inserted in this well casing 24, and below the ground water level, is the first stage blow chamber 22. The first stage blow chamber is also illustrated in detail in FIG. 3.

Assuming a wind speed of approximately 20 mph, compressed air leaving the compressor is directed down the turbine support column through conduit 7 and into air tank 8. Air tank 8 absorbs and stores sudden high-volume energy surges from the compressor that would occur during gusting conditions. Air tank 8 is equipped with a standard relief valve 9 and standard float-type moisture separator 10. Air moves through open air stop 1 and down conduit 11 pushing swing check 12 open. Air from swing check 12 moves to conduit cross 13 where it is directed through open air stop 2 or open air stop 3. Air stop 2 supplies compressed air to the two outlying wells located in the grazing areas. These wells are provided with first and second stage blow chambers, identical in construction to those shown in Drawing FIG. 3. Water lifted from these outlying wells is directed to elevated tanks, which gravity-feed standard ground-level watering tanks filled through standard float valves and strategically positioned in the grazing area. All tanks in the grazing area are assumed to be full of water and no air is flowing through air stop 2. Swing check 14 prevents flow of air downward from cross 13, so all compressed air from the wind turbine is being directed through air stop 3 to conduit tee 15. Air stop 4 feeds a workshop air storage tank. This tank (not shown) is open to the system and responsive to any pressure change at tee 15. It acts similar to a rubber band in absorbing energy from and releasing energy to air conduit 16. No air is flowing through air stop 4. Because the compressed air stored in this shop storage tank is not being utilized, the tank is in a fully-charged condition. No air is flowing through conduit 16 or through air stop 4, but all air from the wind turbine compressor is instead being directed through check valve 17 to tee 18 and through conduit 19. Conduit 19 feeds the master control valve assembly 20. The blow and vent manifold 21 is fed compressed air from conduit 25. The blow and vent manifold 21 acts in response to the master control valve assembly 20 to automatically control the sequential blow and vent process involved in making the two-stage stair-step type water lift. This operation will be fully explained later in the presentation, but for the purposes of continuity will be passed over now. The air flowing down conduit 25 is being directed to the second stage blow chamber 23 via conduit 26 through a valve located on the blow and vent manifold 21. Air pressure pushing downward on the water recently blown from the well to blow chamber 23 is causing the water to move from this chamber through conduit 28 and through check valve 27. Flow through conduit 51 is prevented by a check valve (not shown) inside first stage blow chamber 22. Water passing through check valve 27 is moving up conduit 29 through swing check 30 and into the storage reservoir. The domestic water storage tank 35 is full of water, and a conventional float valve 96 within the tank is preventing flow through conduit 31.

The air and water flow paths just outlined are normal for the system, when a reasonable high wind force is being impressed on the wind turbine and no energy is being extracted from the system. The water lift distance for the outlying wells is far less than the lift distance of the homesite well illustrated, and considerably more water can be lifted from these wells than can be lifted to the domestic water tank with the same energy input. It will be noted from the Drawing FIG. 1 that the highest single step water lift in the system is approximately 200 ft.

Converting the 200 ft. water head to pressure in pounds per sq. in. ($200 \times 0.434 = 87$ psi). The pressure available from the wind turbine compressor in winds of 20 mph is 100 psi, so the pressure available to create flow to the storage reservoir is $100 - 87 = 13$ pounds. Any compressed air diverted to other parts of the system will quickly absorb this 13 pound flow differential and water flow into the pumped storage reservoir 32 will stop. The maximum single lift distance to the domestic water storage tank is 115 ft. (converting water head to psi ... $115 \times 0.434 - 50$ psi), meaning that water will flow into the domestic storage tank with high velocity due to the 50-pound differential. This high flow rate occurs any time the water level drops in this tank when the system is operating as outlined and 100 psi air is available at conduit 25. Because of the low lift distance of the outlying wells, the differential pressure available for flow to their storage tanks is even greater than the 50 pounds available to the domestic water storage tank. This differential pressure spread of more than 50 psi will automatically give the outlying wells priority on the air supply. For instance, a simultaneous draw on the domestic water tank and a draw on the elevated tank in the grazing area will result in change of air flow at cross 13. Air flow will now be through air stop 2 and air flow through air stop 3 will be in a reverse direction for a short period because of the rubber band effect created by the shop air storage tank. When the float valve closes in the storage tank for the outlying well, air will again flow through air stop 3 into the shop air storage tank through air stop 4, and when the pressure in the shop air storage tank builds to its initial pressure, water will again start flowing into the domestic water tank. Installation of a simple pressure valve with a setting over 50 psi in the line downstream of air stop 2 would reverse the well priorities and give the domestic water tank priority over the outlying water tank. In all previous examples of water and air flow through the system, compressed air flow from the wind turbine has been sufficient to meet energy demands of the system. We are now going to trace air and water flow through the system when the turbine-driven compressor is not operating due to a no-wind condition. Pumped storage reservoir 32 will now become the energy source for our system. We now assume an early morning situation where very little, if any, energy demand has been put on the system during the night. Nights winds impressed on the turbine intermittently have added some to the total water stored in the pumped storage reservoir, but an early morning lull has resulted in a total stop of the wind turbine. Water is now drawn from the domestic water storage tank as a result of the normal household early morning activities. Compressed air pressure, equaling the 200 ft. water head created by the lift to the pumped storage reservoir at the time of wind termination still exists in air storage tank 9 and the shop air storage tank, not shown. This stored compressed air at 87 pounds pressure will come on-line to provide the energy to replace the first water drawn from the domestic storage tank 35. Utilization of this tank-stored compressed air will very soon result in a pressure drop at cross 13, which will bring the hydraulic air compressor 34 on the line. The hydraulic air compressor 34 is supplied with water through water stop 33, conduit 36 and strainer 37 located in the bottom of pumped storage reservoir 32. Air stop 5 feeds air to the system through check valve 14 to cross 13. In normal system operation, all hand valves to and from the compressor are left in the open position. This open hand valve configuration also applies to all other hand valves shown in the system during normal system operation. The hydraulic air compressor on this installation is sized so that it can deliver up to 5 cu.ft. of compressed air per minute at a pressure of 75 pounds gage. The duration of compressed air delivery from the hydraulic compressor is totally dependent on the volume of water stored in the pumped storage reservoir. The pressure of the compressed air delivered by the hydraulic air compressor is fixed by the elevation of the storage reservoir which determines the water head available at the compressor inlet. Drawing FIG. 1 shows this water head to be 172 ft., which converts to an air pressure of 75 pounds gage.

An operational characteristic of the hydraulic air compressor is that water flow to the compressor will automatically stop when the compressed air trapped above the incoming water equals the pressure of the water head. In all previous examples tracing flows of air and water through the system, the wind turbine was supplying more energy to the system than was being extracted. The compressed air pressure at tee 13, Drawing FIG. 1, never fell below 75 pounds gage. With the no-wind condition, the turbine stopped and the hydraulic air compressor came on-line to provide compressed air for lifting more water to the domestic water tank. The hydraulic air compressor automatically comes on-line when compressed air energy extraction from the system exceeds wind turbine compressed air energy input. The rancher utilizing a one-half horse-power pneumatic drill to drill holes in fence posts would automatically bring the hydraulic air compressor on-line, regardless of wind turbine output on this installation, because the air draw on the system would be approximately 4 cu.ft. per minute, which exceeds the wind-driven compressor output.

FIG. 2 illustrates the hydraulic air compressor at the start of the water-filling or compression cycle. Taking this device through a cycle, it is assumed that compressor chamber 124 has been pre-charged with air at atmospheric pressure by a just-completed drain and vent cycle.

Water hand valve 33 is open, allowing water from the elevated source 32 to move the compressor chamber through open valve disc 129, controlled by the fill valve control piston 130. Source water pressure is exerted on conduit 180 at all times after the opening of fill valve 33. Conduit 180 feeds source water to a rotary valve 156, which controls the opening of the fill and drain valve discs 129 and 137 respectively. The illustrated beginning of the fill cycle shows an impressed water pressure being applied to common conduit 163, which connects to the top sides of the cylinders housing the fill and drain valve control pistons 130 and 133. Pressure being exerted on these pistons from the top side keep the fill valve disc 129 open and off its seat 128, and the drain valve disc 137 on its seat 138. No water flows through conduit 260 at this time because of the spring check valve 170.

Water flowing into compressor chamber 124 causes a compression of the atmospheric air in this chamber, which migrates upward through conduit designated by break "A". Conduit designated by break "B" is closed by check valve 175.

Compressed air moving upward through the chamber housing float 126 moves through conduit 110 and into the chamber housing float 296, to junction point 291, where it is directed through restrictor valve 288 and into conduit 261. Conduit 261 feeds compressed air to the top of the diaphragm controlling valve 265, which is called the pneumatic dump valve. Pressure exerted on the top side of the diaphragm of this valve closes this valve. An alternate path for the compressed air leaving restrictor valve 288 is into conduit 287 and through valve 114 which is presently being held closed by spring 115.

With a pressure build-up on the top side of the diaphragm of pneumatic dump valve 265, all exits from the compressor chamber 124 are closed. Incoming water continues the compression process and the air pressure builds in the uppermost part of the air compressor assembly. When the compressed air pressure has reached a point corresponding to the spring tension setting on valve 277 (at the top right of the drawing), this valve will open and feed compressed air to the user through air stop 5 and conduit 71 (FIG. 2). Spring-loaded pressure relief valve 277 serves two purposes; it acts as a check valve and it eliminates the possibility of water hammer if no opposing pressures exist in the air supply line 71 (FIG. 2) during a compression cycle.

Use of compressed air from the air supply conduit 71 causes the water level to rise within compressor chamber 124 and flow upward into conduit designated by brake "A". In this conduit are located a series of restrictor plates 176. These restrictor plates have progressively smaller holes which have a throttling effect on the incoming water, but do not restrict air flow.

Water flow into compressor chamber 124 is greatly reduced through the action of these restrictor plates and water flows into the chamber housing float 126 with a very limited flow rate. Float 126 lifts by means of shaft 122 a piece of iron 121 upward into a non-magnetic guide tube 111. The iron lifted is a round cylinder drilled much like the cylinder of a revolver, so it will not act as a piston.

Movement of the iron 121 upward within the non-magnetic guide tube 111 causes it to reach proximity with a magnet 118 attached by a shaft to wheel 117. When the upward movement of the float causes the iron and the magnet to reach adjacent positions, the magnet is pulled inward toward the iron. This rotates the wheel 117, depressing valve stem 116, which triggers the beginning of the drain cycle sequence.

Valve 114 is constructed very similarly to the common Schrader-type car tire valve. Opening this valve causes air to be bled from conduit 261 much faster than it can be replaced through restrictor valve 288. Pressure is immediately dropped from the top side of the diaphragm on the pneumatic dump valve 265 and this valve opens. Water flow is now possible from conduit 260 through the spring check 170 because water pressure at this time far exceeds spring pressure.

Water flowing through conduit 260 goes through the pneumatic dump valve 265 and through a restrictor valve 269 into conduit 270, where it dumps into siphon chamber 152. Restrictor valve 269 functions as a time delay device. The drain cycle does not actually start until the water being released into siphon chamber 152 is transferred into float chamber 141. This transfer does not take place until the water level in siphon chamber 152 reaches a height sufficient to start a siphon in siphon tube 153. The purpose of the time delay is to insure that all usable space within the compressor assembly is full of water and water flow into the compressor chamber 124 has stopped. Setting this time delay is accomplished by observing gate 281 and adjusting valve 269. The optimum setting will be obtained when the starting of the siphon in siphon tube 153 corresponds with a rapid fall in the pressure on gage 281. Unless radical changes occur in the elevation of the water supply head, this will be a one-time adjustment.

The rapid drop in pressure on gage 281 signaled water flow into the compressor had been shut off by the lifting action of float 296 and the closing of valve disc 94. These events only occur when the compressor assembly is full of water, and water flow into the compressor chamber has stopped.

The simultaneous drop in pressure on gage 281, with the starting of a siphon in siphon tube 153 signals the beginning of the actual drain cycle. Water flowing from siphon tube 153 flows into float chamber 141. The elevation of siphon tube 147 and check valve 177 prevent water outflow from the float chamber at this time. Drain tubes 178 and 151 are very small tubes wich prevent false signals during rainstorms. Water flow through these tubes is negligible.

Float 142 is lifted by the incoming water from siphon tube 153. The lifting of the float 142 causes counterweight 143 to drop. The rotary valve disc 160 is rotated, connecting the water supply tube 180 directly to the bottom side of the piston controlling the water inlet valve 129. The top side of this piston 130 and the drain valve piston 133 are now connected, through the rotary valve, to the drain line 139 via conduit 150 and the compressor inlet water valve is now closed by the upward movement of the piston 130. The clockwise rotation of the rotary valve also pressurized the line feeding the bottom side of the piston controlling the drain valve 137. However, this line is provided with a restrictor which prevents upward movement of the drain valve piston until the piston closing the fill valve 129 has reached the top of its stroke. On large systems, this restrictor would take the form of a spring-loaded pressure relief valve.

The drain cycle has now commenced. Water flows out of the compressor chamber through open drain valve 137. A new charge of air at atmospheric pressure is brought in through now-open vent valve 82. Check valve 175 opens to insure a quick drain of the upper assemblies. Water flowing into conduit 139 creates a flow through check valve 177 and drain line 139. Water flowing through check valve 177 causes a slight overflow from float chamber 141, and starts a siphon in siphon tube 147. This siphon is sustained for the duration of the drain cycle by the holdback action of the restrictor 146 in drain line 139.

A complete draining of the compressor chamber allows the siphon created in siphon tube 147 to drain float chamber 141 and the weight of the float rotates the rotary valve back to its illustrated position starting another compression cycle. The restrictor that allowed a time delay in the opening of the drain valve is by-passed by check valve 174 and the opening of the fill valve 129 and the closing of the drain valve 137 is a simultaneous action.

FIG. 3 illustrates the interior mechanism of the total pumping system. Reference designators utilized to indicate the locations of certain components and conduits in FIG. 1 are carried over for orientation purposes to FIG. 3. The inlet air conduit 38 is to the far left and conduit 31 going to the domestic water storage tank is to the far right. Check valve 30 passes water to the pumped storage reservoir. Looking to the bottom of the drawing, the well casing 24 is shown extended down into the ground and below the water table line. In our described system, it is a standard 4-inch well casing but, as previously pointed out, it could be as small as 2 inches in diameter. Inserted into the 4-inch well casing is the first stage blow chamber 22. The first stage blow chamber 22 on this installation is fabricated from 3-inch PVC pipe and easily fits within the 4-inch well casing. The first stage blow chamber is provided with a ball check valve 52 and an inlet strainer 92. Compressed air enters the first stage blow chamber through conduit 49. Conduit 49 also serves as the vent air conduit. Conduit 51 carries water to the second stage blow chamber and extends almost to the bottom of the first stage blow chamber 22. Check valve 50 prevents reverse flow during the venting process. Ball check 52 lifts during the venting process and the total blow chamber 22 floods due to its being below the water table. Two requirements for proper operation of the system are (a) the top of the first stage blow chamber must always be below the lowest expected water table drop line, and (b) the internal volume of the first stage blow chamber must always be greater than the volume of any other blow chambers in the series.

The second stage blow chamber 23 on this installation is constructed of 6-inch PVC pipe. The top of the second stage blow chamber is approximately six feet above ground level and the blow chamber, as well as all connecting components, are firmly supported by a flange and pipe assembly 93 which bolts to a small concrete slab.

Total control of the blow and vent process is maintained by the master control valve assembly 20, consisting of upper valve body 62 and lower valve body 63. This assembly is supported by a bracket (not shown) firmly attached to the second stage blow chamber 23. Master control valves 62 and 63 are three-way pilot duty valves, much smaller than illustrated. They function to control air flow to and from the diaphragms of four valves located below on the blow and vent manifold assembly 21. Master control valve 62, the upper one, controls the blow and vent process to the first stage blow chamber 22. Master control valve 63 controls the blow and vent process to the second stage blow chamber 23. Opening and closing of the two master control valves is accomplished through magnet 67 and counter-weight 68, through the rotative action of pivot wheel and arm assembly 66. Pivot wheel support bracket 94 is firmly attached to the second stage blow chamber cover 79. The blow chamber cover is also fabricated from PVC and bolts to the blow chamber by means of standard flange type bolt and nut arrangement 78. An "0" ring type gasket 77 insures a non-leak condition. The center of the cover is drilled through with a hole large enough to accommodate the magnet 67. A thin piece of stainless steel 76 is fastened to the underside of the PVC cover, utilizing a suitable Epoxy cement. Inside the second stage blow chamber and at the top of float guide shaft 82 will be seen a piece of iron 80 made somewhat in the shape of a piston and affixed solidly to the top of the PVC float guide shaft 82 by pin 81. Float guide shaft 82 is firmly attached by flanges to weighted float 87. Lead or steel shot 88 is added to this float to give it a slight *negative* buoyancy, after final assembly of float shaft 82 and iron 80.

The lead shot required to insure correct float weight is added or subtracted through removable screws 85 and seal rings 86. This feature allows adjustment for float shafts of various lengths and weights, and also allows adjustment for liquids having different specific gravities (i.e., a pump chamber pumping salt water would require more lead shot). The screws and seal washers are covered with Epoxy cement after final weight adjustment is made. Float guide shaft 82 is held in the center of the blow chamber by a loosely fitted guide pin 91. Flange 98 limits downward travel. The master control float 83 is a larger float constructed in the same fashion. This float must have a weight adjustment giving it a *positive* buoyancy when nearly submerged, so that a filling of blow chamber 23 with liquid will cause it to overcome the negative buoyancy of float and shaft assembly 87 and 82. A complete filling of the chamber with proper weight adjustment will cause float 83 to rise up guide shaft 82, where it contacts iron piece 80 with enough pressure to lift it into proximity with magnet 67. This master control float must also have enough weight to pull the iron free of the magnetic force when the chamber is blown free of liquid and it has moved down the shaft to a position where it is contacting float 87. Adjusting the relative weights of the floats is a one-time operation and is done at the time of manufacture, in accordance with the particular blow chamber being fabricated and with a knowledge of the specific gravity of the liquid it will be pumping. Enough general information has now been provided to trace a complete cycle through the pumping system. The Drawing FIG. 3 illustrates a first stage blow in progress. Compressed air, at sufficient pressure to overcome the water head created by the first stage lift, is being provided to conduit 38. Tee 18 branches from this conduit and is impressing a compressed air force through conduits 40 and 41 via tee 39. Conduit 41 goes to the lower master control valve 63. No pressure is passing into this valve because of the down position of valve 54, closing opening port 43. Valve 54 is being held firmly on its seat port 43 by the impressed force on valve actuator 69 created by the impressed weight of counter-weight 68. Any previous pressure existing in conduit 55 has been bled to the atmosphere through port 75 and out the top of valve 63 through now-open port 58. The previous opening of port 58 dropped all pressure on diaphragm domes 56 and 57. A pressure drop on dome 57 caused an immediate closing of the second state blow valve disc 61 and terminated the blow of the second stage blow chamber 23. The drop of dome pressure also caused a simultaneous opening of vent valve disc 59 releasing all compressed air previously contained in the second stage blow chamber. Venting of the second stage blow chamber is being accomplished through conduit 26 through open valve disc 59, and through openings in the valve stem guide and support bracket 60. Moving back upward to the upper master control valve 62, we find the valve actuator 70 has been pushed to a downward position by spring 72. Bleed port 73 is closed by valve 71. Port 42 is open, allowing pressurization air from conduit 40 to be impressed on conduit 44 through port 74. The first stage pressure domes 45 and 46 are being subjected to compressed air pressure from the supply air line. The diaphragms are being deflected downward. Spring pressure from springs positioned under each diaphragm always returns the diaphragms to an upward deflection when the domes are not pressurized. Pressure dome 45 and pressure dome 46 being pressurized caused the first stage blow valve disc 47 to be pushed downward and off its seat. "0" ring packings 64 and 65 prevent air leakage around the blow valve stems. Vent valve disc 48 is being held firmly against its seat. Compressed air from the supply line 25 is flowing into blow and vent manifold body 21 through the bottom center port and through the open first stage blow valve disc 47, where it is directed through the manifold to conduit 49. Compressed air moving down conduit 49 is pushing downward on the water in the chamber. Ball check 52 is being held firmly on its seat by the pressure in the chamber and water is being forced up conduit 51 through check valve 50 because the compressed air pressure in conduit 49 is greater than the water head pressure seen at check valve 50. Water flowing up conduit 51 flows directly into conduit 28 and into the second stage blow chamber 23. Check vave 27 is being held firmly shut by the hydraulic head created by water in vertical conduit 29. A continued movement of water from the first stage blow chamber to the second stage blow chamber causes a continuous movement upward of master control float 83. When the shoulder of this float reaches the elevation of the iron 80, attached to the top of the float guide shaft, the positive buoyancy of the master control float overcomes the negative buoyancy of the iron, guideshaft, and float assembly, pushing the iron in proximity with the magnet. A snap action occurs and the magnet moves downward, locking in position on the top side of stainless steel plate 76. The iron and attached guideshaft and float assembly are retained firmly in this uppermost position by the penetration of the magnetic lines of force through the stainless steel plate 76. Movement of the magnet downward causes a clockwise rotation of pivot wheel and arm assembly 66 and lifts counterweight 68 from valve actuator 69. Spring action immediately closes atmospheric bleed port 58 by moving valve 54 upward. The clockwise rotation of pivot wheel 66 also brings the upper shaft extension of counterweight 68 in contact with the upper master control valve actuator 70, causing spring 72 to be depressed and valve 71 to move up, closing air pressurization port 42 and opening the atmospheric bleed port 73. The above-described events cause a complete reversal of the illustrated blow and vent diaphragms' positions. The first stage blow chamber 22 immediately vents and a blow commences on the second stage blow chamber 23. Compressed air is now applied through open blow disc 61, conduit 26 and into the top of second stage blow chamber 23. The venting of the first stage blow chamber caused ball check valve 52 to lift from its seat and water from the well started to refill the now empty chamber. Water being pushed down conduit 28 is prevented from flowing back to the well by check valve 50. Check valve 27 is being forced open due to a pressure differential and water from the second stage blow chamber is being forced up conduit 29.

With the second stage blow in progress, master control float 83 moves down the float guide shaft 82. A complete blowing of the second stage blow chamber removes all water from around master control float 83 and being weighted with no positive buoyancy, it forces the float, guide, and iron assembly downward, breaking the magnetic holding force on the iron. Counter-weight 68 again moves to the down position illustrated and iron mass 80 drops again to the position illustrated.

The system described and illustrated is one of many possible applications of the water lift system. Total lift of the individual blow chambers is a direct function of the air supply pressure. No fixed volume of compressd air is required to produce flow. This ideally suits the system for an intermittent compressed air supply with wide variations in volume. The wind turbine driven air compressor selected from the ranch application illustrated in FIG. 2 is driving a two-cylinder compressor. Providing this compressor with an unloading device for one cylinder during low-wind conditions would automatically lower the stall point of the turbine wheel, allowing small amounts of water to be pumped even in very low winds. The advantages of using a multi-cylinder compressor with individual cylinder unloading are tremendous on very large systems. In the conventional large wind turbine installations, where the wind turbine is driving a generator, elaborate and expensive methods of speed and output frequency control are utilized. In most of these installations, the very large amounts of extra energy available from a gusting wind condition cannot be utilized. This large energy loss results from the cube ratio that exists between wind velocity and wind turbine output (i.e., a wind turbine that delivers 2 horsepower in 15 mile/per/hour winds will deliver close to 8 horsepower in 30 mph winds). The loading and unloading of air compressor cylinders to track wind velocity could be done very quickly with inexpensive off-the-shelf control devices. Proper sizing of the water lift system would allow rapid absorption of this (extra) energy at a capital cost much lower than would be required for an electrical type installation.

The stair-step type water lift illustrated in the presentation does not have to be limited to a two-step lift. High volume, low head water drops at locations far distant from a desirable farming area could be utilized to drive a large hydraulic air compressor. The low pressure compressed air being utilized to make a multi-step water lift from a source near the farming area. The compressed air produced from a 10-ft. drop could be utilized to make a series of 5-ft. lifts. The water discharged from the final lift being used for irrigation purposes. In very large multi-step water lifting systems, the master control float would not be utilized to cycle the chambers. Resistance probes would be placed at the bottom and the top of each blow chamber. The master control valves would be replaced with small three-way solenoid valves. A custom-built solid state electronic control panel would respond to the resistance changes created by the relative submergence, or non-submergence, of the probes to create the proper sequence in solenoid valve actuation. A small D.C. power supply would be required for this installation. This power could be supplied from a small wet cell battery. Vent air from the blow chamber's exhausting through a small turbine-driven generator would keep the battery in a fully-discharged condition. The sophistication of this control system would probably preclude it from mass-production applications.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An energy collection and storage system, comprising:
   a compressed air source;
   an energy storage means for storing energy as an hydraulic pressure head;
   a pneumatic water pump;
   a compressed air manifold means for coupling compressed air from said compressed air source to said pneumatic water pump;
   water manifold means for delivering water from said pneumatic water pump to said energy storage means; and
   an hydraulic air compressor means controlled by liquid from said energy storage means for providing a supply of compressed air to said compressed air manifold.

2. An energy collection and storage system as defined in claim 1, further comprising water supply means for delivering water from said energy storage means at a pressure head to said hydraulic air compressor for driving said hydraulic air compressor.

3. An energy collection and storage system as defined in claim 2 wherein said compressed air manifold includes a compressed air storage tank and means for providing compressed air to pneumatic devices.

4. An energy collection and storage system as defined in claim 3, further comprising a domestic water storage means coupled to said water manifold for receiving water therefrom.

5. An energy collection and storage system as defined in claim 2 wherein said pneumatic water pump includes:
   a first stage pneumatic displacement water pump means; and
   a second stage pneumatic displacement water pump means elevated above said first stage pneumatic displacement water pump for receiving water from said first stage pneumatic water pump means at a first pressure and delivering it to said water manifold means at an increase pressure and relative to said first pressure.

6. An energy collection and storage system as defined in claim 2 wherein said compressed air source comprises:
   a wind driven turbine; and
   an air compressor driven by said wind driven turbine and coupled to said compressed air manifold.

7. An energy collection and storage system as defined in claim 6, further comprising an air storage tank for receiving compressed air from said air compressor and delivering said received compressed air to said compressed air manifold.

8. An energy collection and storage system as defined in claim 5 wherein said second stage pneumatic displacement water pump means comprises:
   a pump chamber;
   a float within said pump chamber; and
   first and second pilot valves mutually exclusively providing pneumatic coupling to said compressed air manifold in response to the position of said float in said pump chamber.

9. An energy collection and storage system as defined in claim 8, further comprising:
   a first pneumatic valve controlled by said first pilot valve for coupling said compresed air manifold to said first stage pneumatic displacement water pump when said first pneumatic valve is opened to said compressed air manifold and venting said first stage pneumatic displacement pump when said first pneumatic valve is closed to said compressed air manifold; and
   a second pneumatic valve responsive to said second pilot valve for coupling said compressed air manifold to said second stage pneumatic displacement pump chamber when said second pneumatic valve is opened to said compressed air manifold and venting said second stage pneumatic displacement water pump chamber when said second pneumatic valve is closed to said compressed air manifold.

10. An energy collection and storage system as defined in claim 9, further comprising means for opening said second pilot valve to said compressed air manifold in response to said float reaching a predetermined high level in said second stage pneumatic displacement pump chamber and for opening said first pilot valve to said compressed air manifold in response to said float reaching a predetermined low level in said second stage pneumatic displacement water pump chamber.

* * * * *